United States Patent
Huang

(10) Patent No.: US 9,209,704 B2
(45) Date of Patent: Dec. 8, 2015

(54) HARMONICS SUPPRESSION IN A POWER DELIVERY DEVICE

(71) Applicant: Xianghui Huang, Pearland, TX (US)

(72) Inventor: Xianghui Huang, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 14/360,824

(22) PCT Filed: Oct. 9, 2012

(86) PCT No.: PCT/US2012/059382
§ 371 (c)(1),
(2) Date: May 27, 2014

(87) PCT Pub. No.: WO2013/095757
PCT Pub. Date: Jun. 27, 2013

(65) Prior Publication Data
US 2014/0312823 A1    Oct. 23, 2014

Related U.S. Application Data

(60) Provisional application No. 61/578,047, filed on Dec. 20, 2011.

(51) Int. Cl.
| | |
|---|---|
| *H02M 5/40* | (2006.01) |
| *H02M 5/45* | (2006.01) |
| *H02P 27/00* | (2006.01) |
| *H02P 27/06* | (2006.01) |
| *H02M 1/00* | (2007.01) |

(52) U.S. Cl.
CPC ............ *H02M 5/40* (2013.01); *H02M 5/45* (2013.01); *H02M 5/4505* (2013.01); *H02P 27/00* (2013.01); *H02P 27/06* (2013.01); *H02M 2001/0074* (2013.01); *H02M 2001/0077* (2013.01); *H02P 2207/076* (2013.01)

(58) Field of Classification Search
CPC ........................................................ H02P 27/00
USPC ............................................ 318/496, 34, 558
See application file for complete search history.

(56) References Cited

U.S. PATENT DOCUMENTS

| | | | |
|---|---|---|---|
| 3,416,063 A | 12/1968 | Guggi | 321/16 |
| 4,160,938 A | 7/1979 | Akamatsu | 318/82 |
| 4,204,264 A | 5/1980 | Lipman | 363/71 |
| 4,309,643 A | 1/1982 | Akamatsu | 318/138 |

(Continued)

OTHER PUBLICATIONS

Beuermann, M. et al. (2008) "Modular Load Commutated Inverters—A Proven Concept for High Power Applications," *IAS Annual Meeting*, Sep. 2008.

(Continued)

*Primary Examiner* — David S Luo
(74) *Attorney, Agent, or Firm* — ExxonMobil Upstream Research Company Law Department

(57) ABSTRACT

Embodiments described herein provide a power delivery system, as well as a method of configuring the power delivery system. The power delivery system includes two or more rectifiers electrically coupled to an AC power source and configured to generate a direct current. The power delivery system also includes two or more inverters configured to receive the direct current and generate an alternating current waveform for powering a load. Moreover, the two or more rectifiers and the two or more inverters are coupled in series with each other through an inductor.

17 Claims, 4 Drawing Sheets

(56) References Cited

U.S. PATENT DOCUMENTS

| | | | | |
|---|---|---|---|---|
| 4,349,772 | A | * | 9/1982 | Weiss ............................ 318/799 |
| 4,426,611 | A | | 1/1984 | Espelage et al. .............. 318/803 |
| 4,441,064 | A | * | 4/1984 | Cutler et al. .................. 318/798 |
| 4,823,068 | A | | 4/1989 | Delmerico et al. ........... 318/807 |
| 5,126,642 | A | | 6/1992 | Shahrodi ....................... 318/433 |
| 5,459,386 | A | * | 10/1995 | Okachi et al. ......... H02P 21/085 318/721 |
| 6,437,996 | B1 | | 8/2002 | Wobben .......................... 363/37 |
| 7,102,248 | B2 | | 9/2006 | Wobben .......................... 290/44 |
| 7,596,002 | B2 | | 9/2009 | Teichmann ..................... 363/18 |
| 2009/0225570 | A1 | | 9/2009 | Pereira et al. ................... 363/37 |

OTHER PUBLICATIONS

Kwak. S. et al. (2006) "Parallelized Inverters Configuration With Current and Voltage Sources for High Power Applications," $37^{th}$ *IEEE PESC*-2006, Jun. 2006, 7 pgs.

Simond, J. J. et al. (2005) "12-Pulse LCI Sychronous Drive for a 20 MW Compressor Modeling, Simulation, and Measurements," *IEEE IAS Annual Meeting*, Sep. 2005.

Tessarolo, A. et al. (2010) "On the Modeling of Commutation Transients in Split-Phase Synchronous Motors Supplied by Multiple Load-Commutated Inverters," *IEEE Transactions on Industrial Electronics*, v. 57, No. 1, pp. 35-43.

\* cited by examiner

400

HARMONICS SUPPRESSION IN A POWER DELIVERY DEVICE

CROSS REFERENCE TO RELATED APPLICATIONS

This application is the National Stage of International Application No. PCT/US2012/059382, filed Oct. 9, 2012, which claims the priority benefit of U.S. Patent Application No. 61/578,047 filed Dec. 20, 2011 entitled HARMONICS SUPPRESSION IN POWER DELIVERY DEVICE the entirety of which is incorporated by reference herein.

FIELD

The present techniques relate to providing electrical power in high-power systems. Specifically, techniques are disclosed for providing electrical power to drive high-power motors.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Load commutated inverters (LCIs) have proven to be a robust industrial solution to drive large electric motors. For example, in the oil and gas industry, large electric motors are often used in various production processes, such as gas processing and fluid pumping, among others. Load commutated inverters provide an effective way of converting the electrical characteristics of the power received from the power source to the desired electrical characteristics suitable for driving the motor. For example, a load commutated inverter may generate a sinusoidal output current with the desired magnitude and frequency for controlling the speed and power of the motor. However, due to the nature of its operation, the load commutated inverter may also tend to generate undesired electrical signals, known as "harmonics."

A typical load commutated inverter includes an alternating current (AC) to direct current (DC) rectifier coupled to a power source, an output DC to AC inverter coupled to a load, and a DC link coupling the output of the rectifier to the input of the inverter. The AC/DC and DC/AC power conversions are achieved through the switching of semiconductor devices included in the rectifier and inverter. The switching operation generates a pulsed current waveform at both AC sides. The pulsed current waveform includes the desired fundamental sinusoidal current, together with undesirable harmonic components.

The various harmonics and subharmonics generated by a load commutated inverter may tend to create pulsating torques in the motor-driven machinery to which it is coupled. If the frequency of these pulsating torques is close to the natural resonance frequency of the machinery, the pulsating torque could potentially subject the machinery to torsional damage. Because the natural resonance frequency of machinery is usually relatively low, the low-frequency subharmonics may be more likely to excite a torsional resonance in the machinery.

To mitigate the potential for pulsating torques, various techniques have been developed to suppress harmonic current signals in load commutated inverters. For example, a series inductor is usually disposed on the DC link to filter harmonics. However, the size of the inductor can only be limited. Thus, in practice, the inductor cannot completely remove the subharmonics that are due to the switching of rectifier and inverter at different fundamental frequencies.

Another technique for filtering harmonics is described in a publication by J. J. Simond, et al., entitled "12-Pulse LCI Synchronous Drive for a 20 MW Compressor Modeling, Simulation, and Measurements," presented at the IEEE IAS Annual Meeting, September 2005. However, the techniques disclosed therein only achieve cancellation of the harmonics at the AC input and output, with no cancellation of harmonics on the DC link.

A technique for cancellation of harmonics on the DC link is presented in a publication by M. Beuermann, et al., entitled "Modular Load Commutated Inverters—A Proven Concept for High Power Applications," presented at the IAS Annual Meeting, September 2008. The techniques described in this publication seek to reduce harmonics on the DC link by coupling a magnetic filter to the DC links of two load commutated inverters. However, coupling a magnetic filter to the DC link in this way introduces a degree of complexity to the design of the power system.

U.S. Pat. No. 4,823,068 to Delmerico, et al., discloses an induction motor drive that includes source-side and load-side converters with individual control channels for the respective converters. The individual control channels may include a cross tie arrangement between the channels for increased system stability. The source-side converter may also include two series connected bridge rectifiers that may be used to help reduce the harmonics on the source side. However, this arrangement may only cancel harmonics due to the rectifier circuitry on the source side, not on the load side. Therefore, harmonics induced within the current after it has passed through the source side may not be mitigated by the induction motor drive.

SUMMARY

An embodiment described herein provides a power delivery system. The power delivery system includes two or more rectifiers electrically coupled to an AC power source and configured to generate a direct current. The power delivery system also includes two or more inverters configured to receive the direct current and generate an alternating current waveform for powering a load. Moreover, the two or more rectifiers and the two or more inverters are coupled in series with each other through an inductor.

Another embodiment described herein provides a system that includes an AC power source, a multiphase motor, and a power delivery device. The power delivery device includes two or more rectifiers electrically coupled to the AC power source and configured to generate a direct current, as well as two or more inverters configured to receive the direct current and generate an AC waveform for powering the multiphase motor. Moreover, the two or more rectifiers and the two or more inverters are coupled in series with each other through an inductor.

Furthermore, another embodiment provides a method of configuring a power delivery system. The method includes coupling an input of a first inverter drive to an AC power source and coupling an output of the first inverter drive to a multiphase motor, wherein the first inverter drive includes a first rectifier and a first inverter. The method also includes coupling an input of a second inverter drive to the AC power source and coupling an output of the second inverter drive to the multiphase motor, wherein the second inverter drive includes a second rectifier and a second inverter. The method further includes coupling the first rectifier, the second rectifier, the first inverter and the second inverter in series with each other through DC terminals corresponding to each of the first rectifier, the second rectifier, the first inverter and the second inverter.

DESCRIPTION OF THE DRAWINGS

The advantages of the present techniques are better understood by referring to the following detailed description and the attached drawings, in which.

DETAILED DESCRIPTION

Figure 1:
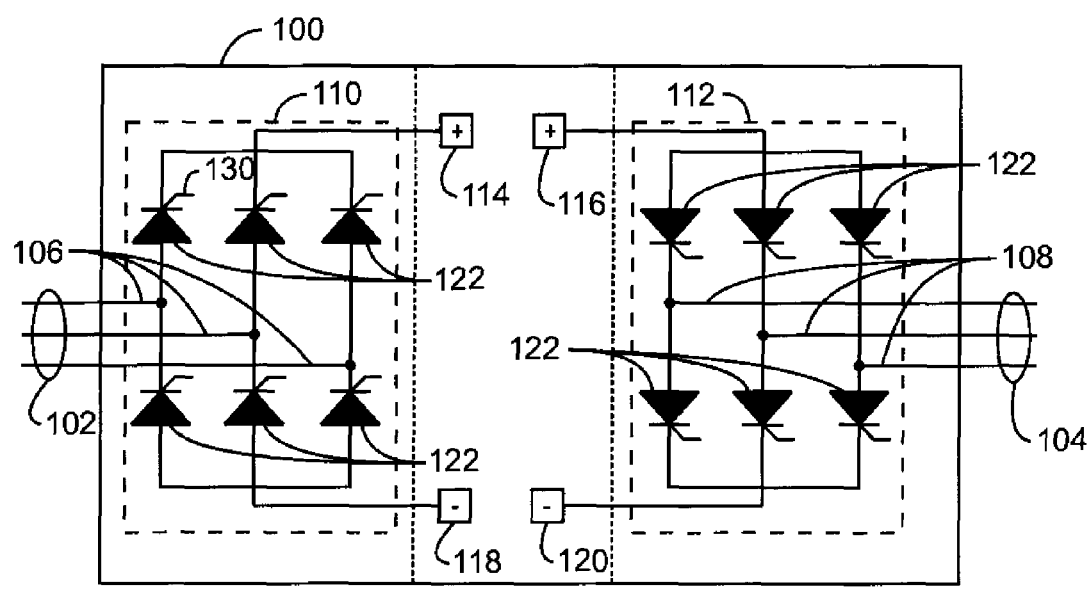
FIG. 1 is circuit diagram of an inverter drive.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

The term "direct current" (DC) refers to a unidirectional flow of electric charge. The term "alternating current" (AC) refers to a flow of electric charge that periodically reverses direction. A DC signal may be obtained from an AC signal using a semiconductor-switching electrical device known as a rectifier, while an AC signal may be obtained from a DC signal using a semiconductor-switching electrical device known as an inverter.

As used herein, the terms "harmonics" and "subharmonics" refer to undesired electrical signals in a power system that may cause distortion of a desired waveform, for example, a sinusoidal waveform. The harmonics may be located in the frequency domain at integrals of the fundamental frequency of the desired waveform. Subharmonics are harmonics located in the frequency domain at frequencies less than the fundamental frequency of the desired waveform. In other words, harmonics and subharmonics may be component frequencies of waveforms, or wave signals, that are integer multiples and fractions of the fundamental frequency of the respective waveform, respectively. Additionally, harmonics and subharmonics may be present in both AC and DC signals.

As discussed above, a "rectifier" is an electrical device that may be used to convert an AC signal to a DC signal. This process is known as "rectification." There are a number of different types of rectifiers, including vacuum tube diodes, mercury arc valves, solid-state diodes, silicon-controlled rectifiers, and other silicon-based semiconductor switches. Silicon-controlled rectifiers are sometimes also referred to as "thyristors." A thyristor is a solid-state semiconductor device that acts as a bi-stable switch, meaning that the thyristor may conduct an electric current when the gate of the thyristor receives a current trigger. Moreover, the thyristor may continue to conduct the electric current as long as thyristor is forward biased, meaning that the voltage across the device has not been reversed. Furthermore, in some cases, a rectifier may include a number of thyristors arrange in series and in parallel.

As discussed above, an "inverter" is a semiconductor-switching electrical device that may be used to convert a DC signal to an AC signal. The AC signal that is obtained using the inverter may be at any desired voltage or frequency with the use of appropriate switching devices, and control circuits. Furthermore, a specific type of inverter known as a "load commutated inverter" (LCI) may be used to generate an AC output current from a DC input current, wherein the AC output current may have the desired magnitude and frequency for controlling the speed and power of a motor.

An "inductor" is a passive two-terminal electrical component that may be used to store energy in a magnetic field. In some cases, an inductor may also be referred to as a "reactor" or a "coil." A particular type of inductor known as a "DC link inductor" may be used to conduct a DC signal over a DC link or bus. Moreover, a DC link inductor may include a number of winding or coils for performing a variety of functions, such as, for example, filtering or smoothing the DC signal. Furthermore, inductors may be utilized in conjunction with capacitors and other components to form tuned circuits that can emphasize or filter out specific signal frequencies.

A "transformer" is an electrical device that may be used to transfer electrical energy from one electrical circuit to another through inductively-coupled conductors, known as coils. In the vast majority of transformers, one or more coils are wound around a ferromagnetic core to form a winding. A transformer that includes a number of windings may be referred to as "multi-winding transformer." Moreover, an AC signal passing through a multi-winding transformer may be split into a multiphase AC waveform, wherein a displacement angle between the multiple phases of the multiphase AC waveform may be determined based on the number of windings of the multi-winding transformer.

As used herein, the term "load" or "motor" may be used to describe an electric motor that converts electrical energy in the form of an AC signal into mechanical work. The motor may be a multiphase AC motor that is configured to accept multiple phases of an AC signal and utilize those phases in order to produce a certain amount of speed and torque. The frequency and amplitude of the AC signal supplied to the motor may control the speed and torque provided by the motor. Moreover, the phase displacement angle between the multiple phases of the AC signal may be determined based on the number of windings in the motor. Furthermore, an electrical motor may be a synchronous AC motor or an asynchronous AC motor. A synchronous motor runs at a speed that is synchronized to the fundamental frequency of the AC signal supplied to the motor, while an asynchronous motor generally runs at a speed slower than the above fundamental frequency An "anode" is an electrode, or electrical conductor, through which electric current flows into a polarized electrical device. A "cathode" is an electrode through which electric current flows out of a polarized electrical device.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

Embodiments described herein provide a power delivery system for supplying an AC power source to a load, as well as a method for configuring such a power delivery system. The power delivery system may include a number of inverter drives. Each inverter drive may include a rectifier for converting an AC input signal to a DC signal, and an inverter for converting the DC signal to an AC output signal. The AC input signal may be generated by a source such as an electrical generator, while the AC output signal may be sent to a load such as a motor. Moreover, each of the inverter drives may be interconnected to provide cancellation of harmonics and subharmonics generated by the inverter drives. In embodiments, the rectifiers and the inverters of all the inverter drives may be connected in series with one another to provide the cancellation. In some embodiments, the rectifiers of all the inverter drives may be connected in series with one another between a DC bus, and the inverters of all the inverter drives may be connected in series with one another between the DC bus. In some embodiments, the series connection may be accomplished through a cross-linked configuration, wherein the rectifiers and the inverters are series coupled in an alternating fashion.

FIG. 1 is circuit diagram of an inverter drive 100. The inverter drive 100 may be used to convert alternating current supplied by a source into a form that may be utilized by a load. For example, the inverter drive 100 may be used to convert the AC input current to an AC output current of any desired frequency or power level suitable for powering a load. The AC input current may be input into the inverter drive 100 through an input terminal 102. In some embodiments, the input terminal 102 may be connected to a source (not shown), such as a gas turbine generator or a transmission system of a power plant. Furthermore, an AC output current may be output from the inverter drive 100 through an output terminal 104. In some embodiments, the output terminal 104 may be connected to a load (not shown), such as an AC electrical motor. As shown in FIG. 1, the AC input current may be a three-phase current supplied to the inverter drive 100 through the input terminal 102 via a number of inverter drive inputs 106. The AC output current may be a three phase current output from the inverter drive 100 through the output terminal 104 via a number of inverter drive outputs 108.

The inverter drive 100 may include a rectifier 110 and an inverter 112. The rectifier 110 may be used to convert the AC input current into a direct current, while the inverter 112 may be used to convert the direct current into the AC output current. The rectifier 110 includes a positive output terminal 114 and a negative output terminal 118 that provides a DC voltage. The inverter 112 includes a positive input terminal 116 and a negative input terminal 120 that receives a DC voltage. In a typical configuration, a DC bus connects the rectifier and the inverter through a series DC link inductor (not shown) such that the positive output terminal 114 of the rectifier 110 is electrically coupled to a positive input terminal 116 of the inverter 112 via the DC link inductor, and the negative output terminal 118 of the rectifier 110 is electrically coupled to the negative input terminal 120 of the inverter 112. In power delivery systems with more than one inverter drive, the DC buses of each inverter drive are usually electrically isolated from one another.

As shown in FIG. 1, each inverter drive input 106 of the rectifier 100 is coupled to a pair of thyristors 122 that rectify the AC input current into a DC output current applied at the output terminals 114 and 118. Each thyristor 122 may be switched on by applying a control signal to a control terminal 130, or gate, of the thyristor 122, and may continue to conduct the current as long as the thyristor is forward-biased. Control circuitry (not shown) may be coupled to the control terminals 130 of the thyristors 122 to coordinate the switching of the thyristors 122. The timing by which the thyristors 122 are switched on controls the amplitude of the current supplied to the DC bus and, thus, the power level supplied to the load. It will be appreciated that other types of switching components can be used in place of thyristors, such as Insulated Gate Bipolar Transistors (IGBTs), Field-Effect Transistors (FETs), and the like. Furthermore, in embodiments wherein the current amplitude is not controlled by the rectifier 110, the rectifier 110 may include diodes in place of the thyristors 122.

Each inverter drive output 108 of each inverter 112 is coupled between a pair of thyristors 122 that are coupled in series between the positive input terminal 116 and the negative input terminal 120. Control circuitry (not shown) may be coupled to the control terminal 130 of each thyristor 122 to coordinate the switching of the thyristors 122. The control circuitry drives the thyristors 122 to switch on in an alternating fashion to produce an approximately sinusoidal waveform at each inverter drive output 108. In embodiments, the inverter is load commutated, meaning that the thyristors 122 are switched off due to a reverse-biasing voltage applied to the thyristor 122 by the load.

As discussed above, the electronic circuitry of the inverter drive 100 will tend to generate harmonics that may be introduced into the alternating current at the input terminal 102 from the AC power source and the output terminal 104 to the load. For example, harmonics may be generated by the rectifier 110 and the inverter 112. The harmonics are located in the frequency domain at integrals of the fundamental frequency of the respective sinusoidal waveform. For example, a 50 Hz fundamental pulsed waveform will include 5× (250 Hz), 7× (350 Hz), 11× (550 Hz), and 13× (650 Hz) harmonics in the alternating current. These harmonics may be referred to as "major harmonics." The harmonics not only exist in the AC channel, but also in the DC channel. For example, in a 6-pulse load commutated inverter, harmonics may be located at approximately 6×, and 12×, the respective fundamental frequency in the DC link current. When the rectifier and inverter sides have different fundamental frequencies, there will be two sets of 6× and 12× current ripples in the DC link current. Therefore, the DC link actually provides a coupling channel between the input and output AC harmonic components. In other words, the rectifier AC harmonics will induce certain harmonics to the direct current, while this direct current will further lead to subharmonics in the inverter AC output. For example, if the fundamental frequency of the rectifier is 50 Hz, and the fundamental frequency of the inverter is 60 Hz, there will be a subharmonic of 10 Hz (6×60 Hz−7×50 Hz). A propagation of harmonics and subharmonics may similarly happen from the inverter to the rectifier.

Figure 2:
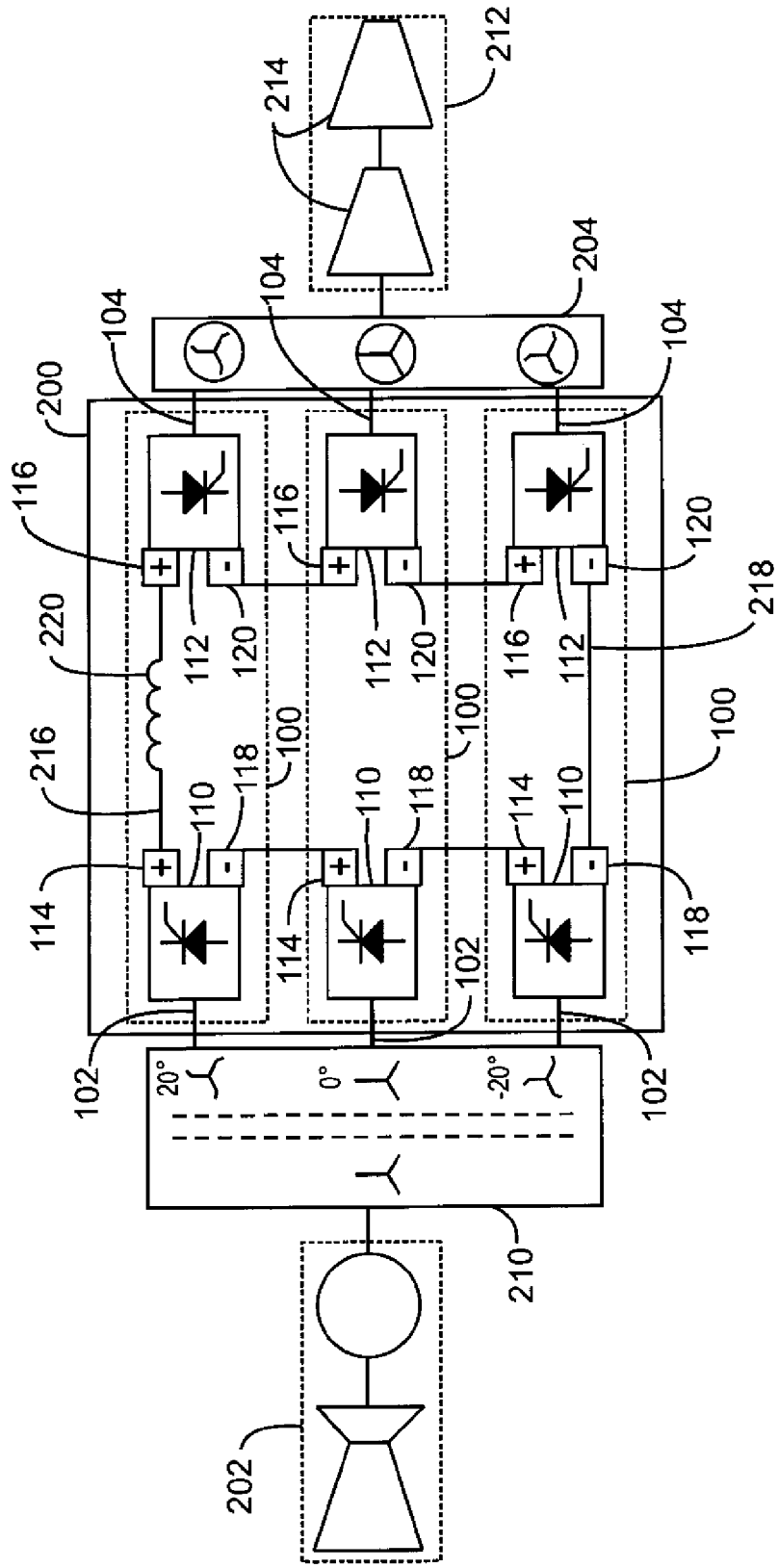
FIG. 2 is a block diagram of a power delivery device that provides cancellation of harmonics.

FIG. 2 is a block diagram of a power delivery device 200 that provides cancellation of harmonics. The power delivery device 200 may be used to supply AC power from a source 202 to a load 204. Like numbered items are as described with respect to FIG. 1. FIG. 2 shows a power delivery device 200 disposed between an AC power source 202 and a load 204. The AC power source 202 may be any type of device that is configured to produce an AC input signal. For example, the AC power source 202 may include a gas turbine generator or a transmission system of a power plant. The power delivery device 200 may be connected to the AC power source 202 through the input terminals 102.

In embodiments, the power delivery device 200 is coupled to the source 202 through a transformer 210. The transformer 210 may be configured to convert an AC signal from the source 202 into a multiphase AC signal, wherein the phases of the multiphase AC signal may be out of phase with one another by a specified displacement angle. The multiphase AC signal may be used as the AC input signal for the power delivery device 200.

The load 204 may be any type of device that is configured to utilize AC power. For example, the load 204 may be a multiphase electrical motor with a number of windings. The power delivery device 200 may be connected to the load 204 through the output terminals 104. Additionally, if the load 204 is a multiphase motor, each of the output terminals 104 may be coupled to a respective set of the windings of the multiphase motor. Moreover, in some embodiments, the load 204 may be mechanically coupled to any number of additional components 212. For example, the additional components 212 may include, but are not limited to, a number of compressors 214. In embodiments, if the load 204 is an electrical motor, the compressors 214 may be driven by a power output of the load 204.

The power delivery device 200 of FIG. 1 includes three inverter drives 100. However, it will be appreciated that the power delivery device 200 may include any suitable number of inverter drives 100 depending, for example, on the number of phases of the multiphase motor, or the load 204. For example, the power delivery device 200 may include two, four or more inverter drives 100. As described with respect to FIG. 1, each inverter drive 100 includes a rectifier 110 and an inverter 112.

In embodiments, each of the input terminals 102 includes three inverter drive inputs 106 (FIG. 1). Each of the input terminals 102 couples one of the rectifiers 110 to the respective windings of the transformer 210. Moreover, each of the output terminals 104 includes three inverter drive outputs 108 (FIG. 1). Each of the output terminals 108 is coupled to one of the windings of the multiphase motor, or the load 204.

Each inverter 112 is driven by the control circuitry (not shown) such that the AC output currents of the three inverters 112 are shifted out of phase from one another by the specified phase angle. In embodiments, the phase angle provided at the input of each inverter drive 100 by the transformer 210 is the same as the phase angle generated by the corresponding inverter 112. The phase angle may be determined based on the number of windings of the multiphase motor. In various embodiments, the phase angle can be calculated as sixty degrees divided by the number of secondary windings of the multiphase motor. For example, a nine-phase motor may include three secondary windings, wherein each of the secondary windings includes three phases that are separated by one-hundred twenty degrees. Thus, the phase angle between each of the secondary windings of the nine-phase motor will be approximately twenty degrees.

In embodiments, the power delivery device 200 may include a DC bus, common to each of the inverter drives 100. The DC bus includes an upper rail 216 and a lower rail 218. To cancel out the harmonics generated in the power delivery device 200, the rectifiers 110 and the inverters 112 of each of the inverter drives 100 may be electrically coupled in series with one another. For example, as shown in FIG. 2, the rectifiers 110 are coupled in series with each other between the upper rail 216 and the lower rail 218 through their respective DC output terminals 114 and 118. More specifically, a positive output terminal 114 of the rectifier 110 of one of the inverter drives 100 may be directly coupled to a negative output terminal 118 of the rectifier 110 of a different one of the inverter drives 112. Each of the rectifiers 110 adds to the overall voltage present on the DC bus.

Similarly, the inverters 112 may also be coupled in series with each other between the upper rail 216 and the lower rail 218 through their respective DC input terminals 116 and 120. More specifically, a positive input terminal 116 of the inverter 112 of one of the inverter drives 100 may be directly coupled to a negative input terminal 120 of the inverter 112 of a different one of the inverter drives 100. Each of the inverters 112 draws current from the DC bus, wherein the current flows in series through each of the inverters 112. Thus, it will be appreciated that at any given time during the operation of the motor, the current path through the inverters 112 will include at least three windings of the motor, or the load 204.

A DC link inductor 220 may be disposed in series with the upper rail 216 of the DC bus. The DC link inductor 220 may serve to suppress harmonics present in the DC signal. Moreover, any number of additional DC link inductors may also be disposed on the upper rail 216 or the lower rail 218 of the DC bus.

Because the rectifiers 110 are arranged in series with one another, the DC voltages generated by the rectifiers 110 will add to produce a combined DC voltage between the upper rail 216 and the lower rail 218. Furthermore, the harmonics produced by each of the rectifiers 110 will be out of phase by the phase angle provided by the transformer 210. Thus, the harmonics will tend to cancel out one another as a result of the series connection of the rectifiers 110, resulting in the reduction of a level of harmonics present on the combined DC bus.

Similarly, because the inverters 112 are arranged in series with one another, the harmonics produced by each of the inverters 112 will be out of phase by the specified phase angle. Thus, the harmonics generated by the inverters 112 will also tend to cancel out one another as a result of the series connection of the inverters 112, resulting in the reduction of the level of harmonics delivered to the multiphase motor. Additionally, the cancellation of the harmonics applies to subharmonics generated due to the different operating frequencies between each rectifier 110 and the corresponding inverter 112.

In some embodiments, the power delivery device 200 may be a six-pulse load commutated inverter (LCI). However, the power delivery device 200 may also be a twelve-pulse LCI, an eighteen-pulse LCI, or a twenty-four-pulse LCI, among others. If the power delivery device 200 is a six-pulse LCI, the power delivery device 200 may include one inverter drive 100. Moreover, if the power delivery device 200 is a twelve-pulse LCI, the power delivery device 200 may include two inverter drives 100. Additionally, if the power delivery device 200 is a twenty-four-pulse LCI, the inverter drive 100 may include four inverter drives 100.

Figure 3:
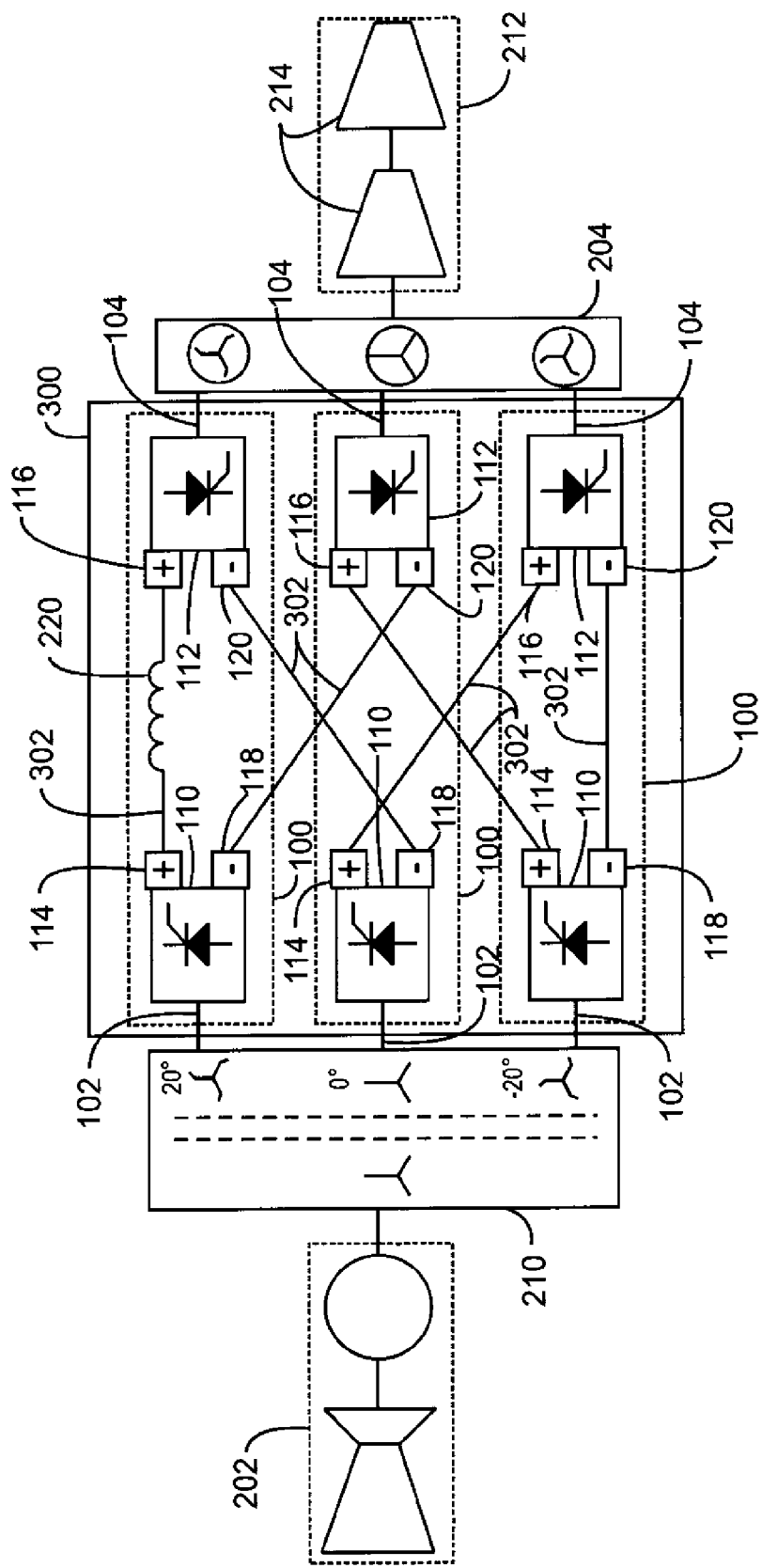
FIG. 3 is a block diagram of a cross-linked power delivery device that provides cancellation of harmonics.

FIG. 3 is a block diagram of a cross-linked power delivery device 300 that provides cancellation of harmonics. The cross-linked power delivery device 300 may also be used to supply AC power from the AC power source 202 to the load 204. Like numbered items are as described with respect to FIGS. 1 and 2. The cross-linked power delivery device 300 may include the input terminals 102 and the output terminals 104 described with respect to FIG. 1. Additionally, the cross-linked power delivery device 300 may be connected to the AC power source 202 through the transformer 210. The load 204 may also be connected to any of the number of additional components 212, including, but not limited to, the compressors 214.

The cross-linked power delivery device 300 may include the inverter drives 100 discussed with respect to FIGS. 1 and 2, wherein each of the inverter drives 100 may include the rectifier 110 and the inverter 112. As shown in FIG. 3, cross-linked connections 302 may be used to cross-link the rectifiers 110 and the inverters 112 of the multiple inverter drives 100 in a series configuration. Each of the positive output terminals 114 of the rectifiers for each of the inverter drives 100 may be coupled to the positive input terminal 116 of one of the inverters 112 of a different inverter drive 100 via the respective one of the cross-linked connections 302. Furthermore, each of the negative output terminals 118 of the rectifiers 110 for each of the inverter drives 100 may be coupled to a negative input terminal 120 of one of the inverters 112 of a different inverter drive 100 via the respective one of the cross-linked connections 302. In this way, the rectifiers 110 and the inverters 112 can be coupled in series with each other in an alternating fashion. As with the configuration shown in FIG. 2, the relative phase difference between inverter drive 100 results in cancellation of the harmonics and subharmonics produced by the inverter drives 100 and the AC power source 202.

As shown in FIG. 3, the DC link inductor 220 may be disposed on an upper cross-link of the cross-linked connections 302, wherein the term "cross-link" may be used to describe an individual one of the cross-link connections 302. In some embodiments, however, a DC link inductor may be disposed on each of the cross-linked connections 302, or on any number of the cross-linked connections 302. In other words, an inductor may be disposed between each of the positive output terminals 114 and the positive input terminals 116, and between each of the negative output terminals 118 and the negative input terminals 120. The inductors may help to further suppress the amount of harmonics present on the DC bus.

Figure 4:
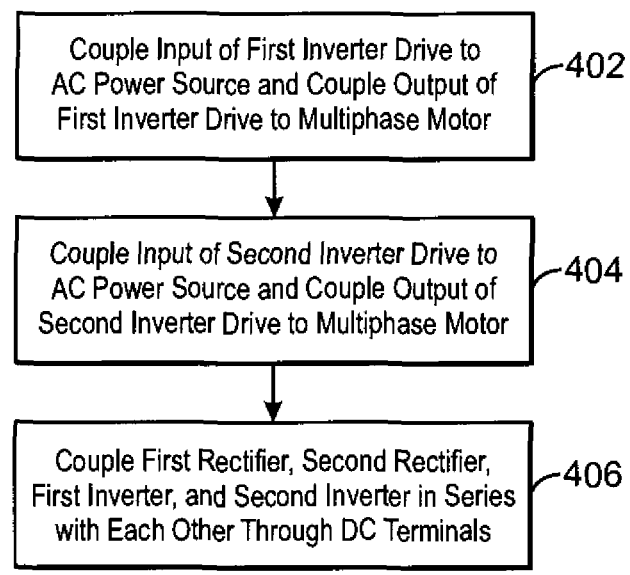
FIG. 4 is a process flow diagram of a method of configuring a power delivery device to provide cancellation of harmonics.

FIG. 4 is a process flow diagram of a method 400 of configuring a power delivery device to provide cancellation of harmonics. The method 400 may begin at block 402 with the coupling of an input of a first inverter drive to an AC power source and the coupling of an output of the first inverter drive to a multiphase motor. The first inverter drive may include a first rectifier and a first inverter. The first rectifier may be coupled to a number of input terminals through which the first inverter drive may receive a first AC input from the AC power source. Further, the first inverter may be coupled to a number of output terminals through which the first inverter drive may send a first AC output to the multiphase motor.

At block 404, an input of a second inverter drive may be coupled to the AC power source, and an output of the second inverter drive may be coupled to the multiphase motor. The second inverter drive may include a second rectifier and a second inverter. The second rectifier may be coupled to a number of input terminals through which the second inverter drive may receive a second AC input from the AC power source. Further, the second inverter may be coupled to a number of output terminals through which the second inverter drive may send a second AC output to the multiphase motor.

In various embodiments, the input of the first inverter drive and the input of the second inverter drive may include multiphase waveforms, wherein the multiphase waveforms may include multiple phases separated by a specified displacement angle. Additionally, the output of the first inverter drive and the output of the second inverter drive may also include multiphase waveforms, wherein the multiphase waveforms may include multiple phases separated by a specified displacement angle. The specified phase displacement angle may be the same for both the inputs and the outputs of the power delivery device. Moreover, the phase displacement angle may depend on a number of windings of a multiphase motor or a transformer, or both, that are electrically coupled to the outputs or inputs, respectively, of the power delivery device.

At block 406, the first rectifier, the second rectifier, the first inverter, and the second inverter may be coupled in series with each other through the DC terminals. The series connection of the rectifiers and inverters may be accomplished according to any of a number of configurations. For example, in some embodiments, the first rectifier and the second rectifier may be coupled in series with each other between an upper rail and a lower rail of a DC bus of the power delivery device, and the first inverter and the second inverter may be coupled in series with each other between the upper rail and the lower rail of the DC bus. Moreover, in some embodiments, the first rectifier, the second rectifier, the first inverter, and the second inverter may be connected in series according to a cross-linked configuration. Steps 402 through 406 may be repeated for any suitable number of subsequent inverter drives that may be added to the power delivery device.

It is to be understood that FIG. 4 is not intended to indicate that the steps of the method 400 are to be executed in any particular order, or that all of the steps of the method are to be included in every case. Moreover, any number of additional steps may be added to the method 400 according to each particular application. For example, one or more DC link inductors may be added to the electrical connections coupling the first and second rectifiers and to the first and second inverters. For example, a DC link inductor may be added to the upper rail of the DC bus. Furthermore, for the cross-linked configuration, a DC link inductor may be included on each cross-link of the cross-linked connections, e.g., between each rectifier and corresponding connected inverter.

Once the power delivery device has been configured according to the method 400, the components of the system, e.g., the rectifiers, inverters, and electrical connections may be arranged within an enclosure configured to isolate and protect the components of the power delivery device. Moreover, a chassis, or internal framework, within the device case may be utilized to support the components of the power delivery device and to maintain the components in their respective positions within the device case. The chassis may also be used to protect the electrical circuitry and wiring of the power delivery device.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

EMBODIMENTS

Embodiments of the invention may include any of the following methods and systems, among others, as discussed herein. This is not to be considered a complete listing of all possible embodiments, as any number of variations can be envisioned from the description above.

Embodiment A: A power delivery system, comprising:
two or more rectifiers electrically coupled to an AC power source and configured to generate a direct current; and
two or more inverters configured to receive the direct current and generate an alternating current waveform for powering a load;

wherein the two or more rectifiers and the two or more inverters are coupled in series with each other through an inductor.

Embodiment B: The power delivery system of Embodiment A, comprising a DC bus comprising an upper rail and a lower rail, wherein the two or more rectifiers are coupled in series with each other between the upper rail and the lower rail and the two or more inverters are coupled in series with each other between the upper rail and the lower rail.

Embodiment C: The power delivery system of Embodiment A or B, wherein:
a positive output terminal of one of the rectifiers is directly coupled to a negative output terminal of a different one of the rectifiers; and
a positive input terminal of one of the inverters is directly coupled to a negative input terminal of a different one of the inverters.

Embodiment D: The power delivery system of any of Embodiments A-C, wherein the two or more inverters are cross-linked with the two or more rectifiers.

Embodiment E: The power delivery system of Embodiment A, wherein:
each of the rectifiers comprises a positive output terminal and a negative output terminal and each of the inverters comprises a positive input terminal and a negative input terminal; and
each of the positive output terminals of the rectifiers is coupled to the positive input terminal of a different one of the inverters and each of the negative output terminals is coupled to a negative input terminal of a different one of the inverters.

Embodiment F: The power delivery system of any of Embodiments A-E, further comprising a transformer coupled to the AC power source and comprising two or more output windings, wherein each of the two or more output windings is coupled to an input of one of the two or more rectifiers.

Embodiment G: The power delivery system of any of Embodiments A-F, wherein the load is a multiphase motor comprising a number of windings and each inverter comprises an output terminal coupled to a respective set of the number of windings.

Embodiment H: The power delivery system of Embodiment G, wherein:
the two or more rectifiers and the two or more inverters are grouped into pairs, each pair comprising one of the rectifiers and one of the inverters; and
outputs of the pairs are out of phase by a specified displacement angle that depends on the number of windings of the multiphase motor.

Embodiment I: A system comprising:
an AC power source;
a multiphase motor; and
a power delivery device comprising:
two or more rectifiers electrically coupled to the AC power source and configured to generate a direct current; and
two or more inverters configured to receive the direct current and generate an AC waveform for powering the multiphase motor; and
wherein the two or more rectifiers and the two or more inverters are coupled in series with each other through an inductor.

Embodiment J: The system of Embodiment I, comprising a DC bus comprising an upper rail and a lower rail, wherein the two or more rectifiers are coupled in series with each other between the upper rail and the lower rail and the two or more inverters are coupled in series with each other between the upper rail and the lower rail.

Embodiment K: The system of Embodiment I or J, wherein:
a positive output terminal of one of the rectifiers is directly coupled to a negative output terminal of a different one of the rectifiers; and
a positive input terminal of one of the inverters is directly coupled to a negative input terminal of a different one of the inverters.

Embodiment L: The system of Embodiment I, wherein:
each of the rectifiers comprises a positive output terminal and a negative output terminal and each of the inverters comprises a positive input terminal and a negative input terminal; and
each of the positive output terminals of the rectifiers is coupled to the positive input terminal of a different one of the inverters and each of the negative output terminals is coupled to a negative input terminal of a different one of the inverters.

Embodiment M: The system of any of Embodiments I-L, wherein the two or more inverters are cross-linked with the two or more rectifiers.

Embodiment N: The system of any of Embodiments I-M, wherein the multiphase motor comprises a plurality of windings and each inverter comprises an output terminal coupled to a respective one of the windings.

Embodiment O: The system of Embodiment I, wherein:
the two or more rectifiers and the two or more inverters are grouped into pairs, each pair comprising one of the rectifiers and one of the inverters; and
outputs of the pairs are out of phase by a specified displacement angle that depends on the number of windings of the multiphase motor.

Embodiment P: The system of any of Embodiments I-O, further comprising a compressor mechanically coupled to and driven by the multiphase motor.

Embodiment Q: The system of any of Embodiments I-P, wherein the AC power source comprises a gas turbine generator or an AC power line.

Embodiment R: The system of any of Embodiments I-Q, further comprising a transformer coupled to the AC power source, wherein the transformer comprises two or more output windings, and wherein each of the two or more output windings is coupled to an input of one of the two or more rectifiers.

Embodiment S: A method of configuring a power delivery system, comprising:
coupling an input of a first inverter drive to an AC power source and coupling an output of the first inverter drive to a multiphase motor; the first inverter drive comprising a first rectifier and a first inverter;
coupling an input of a second inverter drive to the AC power source and coupling an output of the second inverter drive to the multiphase motor; the second inverter drive comprising a second rectifier and a second inverter; and
coupling the first rectifier, the second rectifier, the first inverter and the second inverter in series with each other through DC terminals corresponding to each of the first rectifier, the second rectifier, the first inverter and the second inverter.

Embodiment T: The method of Embodiment S, wherein the input of the first inverter drive and the input of the second inverter drive comprise multiphase waveforms, and wherein the multiphase waveforms comprise multiple phases separated by a specified displacement angle.

Embodiment U: The method of Embodiment S or T, wherein the output of the first inverter drive and the output of the second inverter drive comprise multiphase waveforms, and wherein the multiphase waveforms comprise multiple phases separated by a specified displacement angle.

Embodiment V: The method of any of Embodiments S-U, further comprising coupling an input of a subsequent inverter drive to the AC power source and coupling an output of the subsequent inverter drive to the multiphase motor; the subsequent inverter drive comprising a subsequent rectifier and a subsequent inverter.

Embodiment W: The method of any of Embodiments S-U, further comprising coupling the first rectifier and the second rectifier to the first inverter and the second inverter using an upper rail and a lower rail of a DC bus.

Embodiment X: The method of any of Embodiments S-U, wherein coupling the first rectifier, the second rectifier, the first inverter and the second inverter in series comprises cross-linking the first rectifier, the second rectifier, the first inverter and the second inverter.

What is claimed is:

1. A power delivery system, comprising:
    two or more rectifiers electrically coupled to an AC power source and configured to generate a direct current;
    a transformer coupled to the AC power source and comprising two or more output windings to convert current from the AC power source to a multiphase AC signal, wherein each of the two or more output windings is coupled to an input of one of the two or more rectifiers, and wherein phases of the multiphase AC signal are out of phase with one another by a specified displacement angle; and
    two or more inverters configured to receive the direct current and generate an alternating current waveform for powering a load;
    wherein the two or more rectifiers and the two or more inverters are coupled in series with each other through an inductor; and further comprising
    a DC bus comprising an upper rail and a lower rail, wherein the two or more rectifiers are coupled in series with each other between the upper rail and the lower rail and the two or more inverters are coupled in series with each other between the upper rail and the lower rail;
    wherein a positive output terminal of one of the rectifiers is directly coupled to a negative output terminal of a different one of the rectifiers; and wherein
    a positive input terminal of one of the inverters is directly coupled to a negative input terminal of a different one of the inverters.

2. The power delivery system of claim 1, wherein the two or more inverters are cross-linked with the two or more rectifiers.

3. The power delivery system of claim 2, wherein:
    each of the rectifiers comprises a positive output terminal and a negative output terminal and each of the inverters comprises a positive input terminal and a negative input terminal; and
    each of the positive output terminals of the rectifiers is coupled to the positive input terminal of a different one of the inverters and each of the negative output terminals is coupled to a negative input terminal of a different one of the inverters.

4. The power delivery system of claim 1, wherein the load is a multiphase motor comprising a number of windings and each inverter comprises an output terminal coupled to a respective set of the number of windings.

5. The power delivery system of claim 4, wherein:
    the two or more rectifiers and the two or more inverters are grouped into pairs, each pair comprising one of the rectifiers and one of the inverters; and
    outputs of the pairs are out of phase by a specified displacement angle that depends on the number of windings of the multiphase motor; and wherein the specified displacement angle associated with the outputs of the pairs is the same as the displacement angle associated with the multiphase AC signal.

6. A system comprising:
    an AC power source;
    a multiphase motor; and
    a power delivery device comprising:
        two or more rectifiers electrically coupled to the AC power source and configured to generate a direct current;
        a transformer coupled to the AC power source, wherein the transformer comprises two or more output windings, and wherein each of the two or more output windings is coupled to an input of one of the two or more rectifiers, and further wherein phases of the multiphase AC signal are out of phase with one another by a specified displacement angle; and
        two or more inverters configured to receive the direct current and generate an AC waveform for powering the multiphase motor;
        wherein the two or more rectifiers and the two or more inverters are coupled in series with each other through an inductor;
    wherein each of the rectifiers comprises a positive output terminal and a negative output terminal and each of the inverters comprises a positive input terminal and a negative input terminal; and
        wherein each of the positive output terminals of the rectifiers is coupled to the positive input terminal of a different one of the inverters and each of the negative output terminals is coupled to a negative input terminal of a different one of the inverters.

7. The system of claim 6, comprising a DC bus comprising an upper rail and a lower rail, wherein the two or more rectifiers are coupled in series with each other between the upper rail and the lower rail and the two or more inverters are coupled in series with each other between the upper rail and the lower rail.

8. The system of claim 6, wherein:
    a positive output terminal of one of the rectifiers is directly coupled to a negative output terminal of a different one of the rectifiers; and
    a positive input terminal of one of the inverters is directly coupled to a negative input terminal of a different one of the inverters.

9. The system of claim 6, wherein the two or more inverters are cross-linked with the two or more rectifiers.

10. The system of claim 6, wherein the multiphase motor comprises a plurality of windings and each inverter comprises an output terminal coupled to a respective one of the windings.

11. The system of claim 6, wherein:
    the two or more rectifiers and the two or more inverters are grouped into pairs, each pair comprising one of the rectifiers and one of the inverters; and
    outputs of the pairs are out of phase by a specified displacement angle that depends on the number of windings of the multiphase motor, and wherein the specified displacement angle associated with the outputs of the pairs is the same as the specified displacement angle associated with the multiphase AC signal.

12. The system of claim 6, comprising a compressor mechanically coupled to and driven by the multiphase motor.

13. The system of claim 6, wherein the AC power source comprises a gas turbine generator or an AC power line.

14. A method of configuring a power delivery system, comprising:
- coupling an input of a first inverter drive to an AC power source and coupling an output of the first inverter drive to a multiphase motor; the first inverter drive comprising a first rectifier and a first inverter;
- coupling an input of a second inverter drive to the AC power source and coupling an output of the second inverter drive to the multiphase motor; the second inverter drive comprising a second rectifier and a second inverter; and
- coupling the first rectifier, the second rectifier, the first inverter and the second inverter in series with each other through DC terminals corresponding to each of the first rectifier, the second rectifier, the first inverter and the second inverter;
- wherein the input of the first inverter drive and the input of the second inverter drive comprise multiphase waveforms, and wherein the multiphase waveforms comprise multiple phases separated by a specified displacement angle, and
- wherein the output of the first inverter drive and the output of the second inverter drive comprise multiphase waveforms, and wherein the multiphase waveforms comprise multiple phases separated by the specified displacement angle.

15. The method of claim 14, comprising coupling an input of a subsequent inverter drive to the AC power source and coupling an output of the subsequent inverter drive to the multiphase motor; the subsequent inverter drive comprising a subsequent rectifier and a subsequent inverter.

16. The method of claim 14, comprising coupling the first rectifier and the second rectifier to the first inverter and the second inverter using an upper rail and a lower rail of a DC bus.

17. The method of claim 14, wherein coupling the first rectifier, the second rectifier, the first inverter and the second inverter in series comprises cross-linking the first rectifier, the second rectifier, the first inverter and the second inverter.

\* \* \* \* \*